(12) United States Patent
Rai et al.

(10) Patent No.: US 9,689,332 B2
(45) Date of Patent: Jun. 27, 2017

(54) METHOD AND DEVICE FOR CONTROLLING AN INTERNAL COMBUSTION ENGINE

(71) Applicant: ROBERT BOSCH GMBH, Stuttgart (DE)

(72) Inventors: Karthik Rai, Stuttgart (DE); Jason Schwanke, Novi, MI (US)

(73) Assignee: Robert Bosch GmbH, Stuttgart (DE)

( * ) Notice: Subject to any disclaimer, the term of this patent is extended or adjusted under 35 U.S.C. 154(b) by 177 days.

(21) Appl. No.: 14/382,481

(22) PCT Filed: Jan. 24, 2013

(86) PCT No.: PCT/EP2013/051283
§ 371 (c)(1),
(2) Date: Sep. 2, 2014

(87) PCT Pub. No.: WO2013/127572
PCT Pub. Date: Sep. 6, 2013

(65) Prior Publication Data
US 2015/0107555 A1    Apr. 23, 2015

(30) Foreign Application Priority Data
Mar. 2, 2012 (DE) .................. 10 2012 203 325

(51) Int. Cl.
*F02D 41/06* (2006.01)
*F02D 41/10* (2006.01)
(Continued)

(52) U.S. Cl.
CPC .......... *F02D 41/065* (2013.01); *F02D 13/08* (2013.01); *F02D 41/042* (2013.01);
(Continued)

(58) Field of Classification Search
CPC ...... F02D 41/065; F02D 13/08; F02D 41/042; F02D 41/105; F02N 11/0844; F02N 2019/008; Y02T 10/48
See application file for complete search history.

(56) References Cited

U.S. PATENT DOCUMENTS

| 7,051,693 | B2 * | 5/2006 | Tetsuno | F02D 41/042 |
| | | | | 123/179.5 |
| 7,461,621 | B2 * | 12/2008 | Ota | F02B 23/104 |
| | | | | 123/179.3 |

(Continued)

FOREIGN PATENT DOCUMENTS

| DE | 103 01 191 | 7/2004 |
| EP | 2 322 784 | 5/2011 |
| EP | 2 410 158 | 1/2012 |

*Primary Examiner* — Joseph Dallo
(74) *Attorney, Agent, or Firm* — Norton Rose Fulbright US LLP; Gerard Messina

(57) ABSTRACT

A method for the rapid restarting of an internal combustion engine that is slowing down at a reduced supplied air volume, in which the supplied air volume is increased again following a detected restart request and an ignitable fuel/air mixture is produced by a fuel injection in an intake cylinder that is in the intake cycle when the supplied air volume is increased, and the mixture is ignited in the intake cylinder to produce a combustion in the power cycle of the intake cylinder.

16 Claims, 2 Drawing Sheets

(51) Int. Cl.
  *F02N 11/08* (2006.01)
  *F02D 13/08* (2006.01)
  *F02D 41/04* (2006.01)
  *F02N 19/00* (2010.01)

(52) U.S. Cl.
  CPC ........ *F02D 41/105* (2013.01); *F02N 11/0844* (2013.01); *F02N 2019/008* (2013.01); *Y02T 10/48* (2013.01)

(56) References Cited

U.S. PATENT DOCUMENTS

| | | | | |
|---|---|---|---|---|
| 7,461,622 B2* | 12/2008 | Maemura | ................ | F02D 37/02 123/179.5 |
| 8,036,817 B2* | 10/2011 | Ota | ...................... | F02B 23/104 123/179.16 |
| 8,265,860 B2* | 9/2012 | Ichinose | ................ | F02D 17/04 123/179.16 |
| 8,589,056 B2* | 11/2013 | Hozumi | ................. | F02D 17/04 123/179.18 |
| 9,140,201 B2* | 9/2015 | Kato | ....................... | B60K 6/48 |
| 9,222,453 B2* | 12/2015 | Gibson | ................ | F02D 41/042 |
| 9,400,742 B2* | 7/2016 | Miyaki | ................ | F02D 41/042 |
| 2003/0041830 A1* | 3/2003 | Sugiura | ................ | F02D 11/105 123/179.4 |
| 2003/0041831 A1* | 3/2003 | Aoki | .................... | B60K 6/485 123/179.4 |
| 2005/0228575 A1* | 10/2005 | Murakami | ........... | F02D 41/042 701/112 |
| 2009/0037085 A1* | 2/2009 | Kojima | ................ | F02N 99/006 701/113 |
| 2011/0137544 A1* | 6/2011 | Kawazu | ............. | F02N 11/0855 701/113 |
| 2011/0246046 A1* | 10/2011 | Ichinose | ................ | F02D 17/04 701/103 |
| 2012/0029797 A1* | 2/2012 | Notani | ............... | F02N 11/0844 701/113 |

* cited by examiner

METHOD AND DEVICE FOR CONTROLLING AN INTERNAL COMBUSTION ENGINE

FIELD OF THE INVENTION

The present invention relates to a method for the rapid starting of an internal combustion engine, especially in a so-called "change-of-mind situation" in which the driver, e.g., by removing the pressure on the accelerator, undertakes measures that signal to a start-stop device to switch off the engine; then, however, even prior to or immediately after the standstill of the internal combustion, the driver signals that he expects an acceleration of the vehicle, for instance by pressure on the accelerator. According to another aspect, the present invention relates to a computer program for executing the method of the present invention, to an electronic storage medium on which this computer program is stored, and to a control and/or regulation device that is/are programmed in such a way that it/they execute(s) the method of the present invention if such an execution is required.

BACKGROUND INFORMATION

From DE 103 01 191 A1, a method for operating an internal combustion engine is believed to be understood, in which a first cylinder is identified that comes to a standstill in its compression cycle or power cycle when the internal combustion engine is slowing down. For an instant shortly before the internal combustion engine comes to a standstill, at which a compressing cylinder is no longer able to be brought over a compression peak, a second cylinder is selected whose intake or discharge valve is open then. The charge of this second cylinder is adjusted in such a way that one of the cylinders comes to a stop in a power phase approximately at a first predefined crank angle after a top dead center.

SUMMARY OF THE INVENTION

In contrast, the method having the features described herein has the advantage that the internal combustion engine is able to be restarted even before standstill, which shortens the time for the restart considerably.

The present invention is especially advantageous if the method for the rapid restart of the internal combustion engine slowing down at a reduced supply of air is executed. If after a detected restart request, the supplied air volume is then increased again and an ignitable fuel/air mixture is generated by a fuel injection in an intake cylinder which is in the intake cycle when an increase in the supplied air volume occurs, and if this mixture is ignited in the intake cylinder in order to produce a combustion in the power stroke of the intake cylinder, then this has the special advantage that the internal combustion engine is brought into a startup condition in an especially rapid manner.

The reduction in the air volume supplied to the internal combustion engine is usually undertaken in order to increase the comfort during the slow-down of the internal combustion engine, that is to say, during its engine speed reduction following an ignition switch-off. This reduction may be implemented by closing the throttle valve, for example, but other arrangements for controlling the air volume are conceivable as well, such as a variable valve control.

If the supplied air volume is increased as soon as an engine speed of the internal combustion engine has dropped below a predefinable engine speed threshold, this has the advantage that such a measure makes it possible to control the slowing down behavior of the internal combustion engine in an especially satisfactory manner; in the presence of a renewed startup request, such as by an activation of the accelerator, this has the result that the internal combustion engine can be restarted in a controlled manner, in particular. However, if no restart request has arrived, then this increase in the air volume makes it possible to control the slowing down behavior in such a way that an especially rapid restart is possible at a later point in time, for instance in that the internal combustion engine comes to a standstill in a controlled switch-off position, but also because the internal combustion engines comes to a standstill in an especially rapid manner.

If an ignitable fuel/air mixture is produced through a fuel injection in a discharge cylinder which is the next cylinder after the intake cylinder to enter the intake cycle, then the fact is utilized that the second cylinder after the intake cylinder switching over into its power cycle after the intake cylinder is now prepared for an ignition, so that a further increase in the engine speed of the internal combustion engine is possible if required. This leads to increased flexibility with regard to the further progress of the method.

When the supplied air volume is increased, the throttle valve (or any other arrangement for metering the air quantity) is opened to an opening crank angle that lies a few crank angle degrees ahead of top dead center at which the intake cylinder transitions from the intake cycle to the compression cycle. If this opening crank angle occurs earlier or if the throttle valve or the other arrangements for metering the air volume is opened further, then a larger air volume is supplied to the intake cylinder in comparison with a later opening crank angle, i.e., closer to said dead center at which the intake cylinder transitions to its compression cycle. It is especially advantageous if the opening crank angle is selected such that the combustion produced in the intake cylinder is powerful enough to shift the exhaust cylinder up to its power cycle. In its intake cycle, the discharge cylinder has been supplied with an air volume that is increased further in comparison with the intake cylinder, so that the spring tensions in the compression in its compression cycle are relatively high.

As an alternative or in addition, together with the combustion in the intake cylinder, a further torque source is able to generate a torque that is large enough to shift the discharge cylinder (ZYL2) to its power cycle.

For example, an electrical machine as a further torque source can generate a torque of sufficient magnitude to shift the discharge cylinder into its power cycle. This may be accomplished with the aid of a starter, for instance, which is able to be engaged at the still prevailing engine speed of the internal combustion engine. Especially suitable is also a permanently engaged, e.g., belt-driven, starter or starter generator. Also conceivable is the support by an electrical machine in a hybridized drive train, for instance if the torque of the electrical machine is able to be switched on via a planetary gearing, or, in an axle hybrid, if a second axle of an automobile, whose first axle is driving the internal combustion engine, is driven. In conjunction with an adequately dimensioned combustion in the intake cylinder, an additional torque by an electrical machine is able to increase the reliability of the method.

However, as an alternative or in addition, it is also possible to use another clutch that is able to separate and connect the crankshaft from or to the wheels of the vehicle, as a further torque source. The open clutch is closed in this case, in order to thereby transmit a torque to the crankshaft from the kinetic energy of the rolling vehicle. Through such a clutch start, a starter provided in the vehicle may be configured for fewer starts across its service life, which provides a cost advantage for the overall system.

In a further advantageous development, a hydraulic pressure reservoir may be used as a further torque source. The connection of a torque generated by a hydraulic pressure reservoir is especially advantageous in that the advantages of using a clutch start are combined with the advantage of enabling such a torque support even if the vehicle is stopped.

In further, especially advantageous developments, the magnitude of the torque generated by the further torque source is selected as a function of an engine speed of the internal combustion engine at a final dead center. The final dead center in this case denotes the dead center at which the discharge cylinder moves to its compression cycle. It has been discovered through testing that it is possible to use the engine speed at the final dead center to predict whether a direct startup of the internal combustion engine will be successful without the assistance of a torque generated by the further torque source.

The start becomes especially reliable if the further torque source generates a torque when the engine speed of the internal combustion engine at the final dead center is below a predefinable supplementary torque engine speed threshold.

On the other hand, if the further torque source is controlled in such a way that it generates no torque (that is to say, couples it into the crankshaft) in cases where the engine speed of the internal combustion engine at the final dead center is not less than a predefinable supplementary torque rotational speed threshold, then the starter is able to be configured for as few starts as possible over its service life, if torque assistance by a starter is provided.

It is especially advantageous if these two mentioned specific embodiments are combined in a further advantageous development, that is to say, the further torque source generates a torque exactly when the engine speed of the internal combustion engine at the final dead center is less than a predefinable supplementary torque engine speed threshold.

It is especially advantageous if the ignitable fuel/air mixture generated in the discharge cylinder is ignited there in order to produce a combustion in the power cycle of the discharge cylinder. Since the discharge cylinder, by definition, immediately follows the intake cylinder in the ignition sequence, an especially reliable new startup of the internal combustion engine is possible as a result.

Especially advantageous exemplary embodiments of the method of the present invention are shown in the figures. Additional specific embodiments are possible.

DETAILED DESCRIPTION

Figure 1:
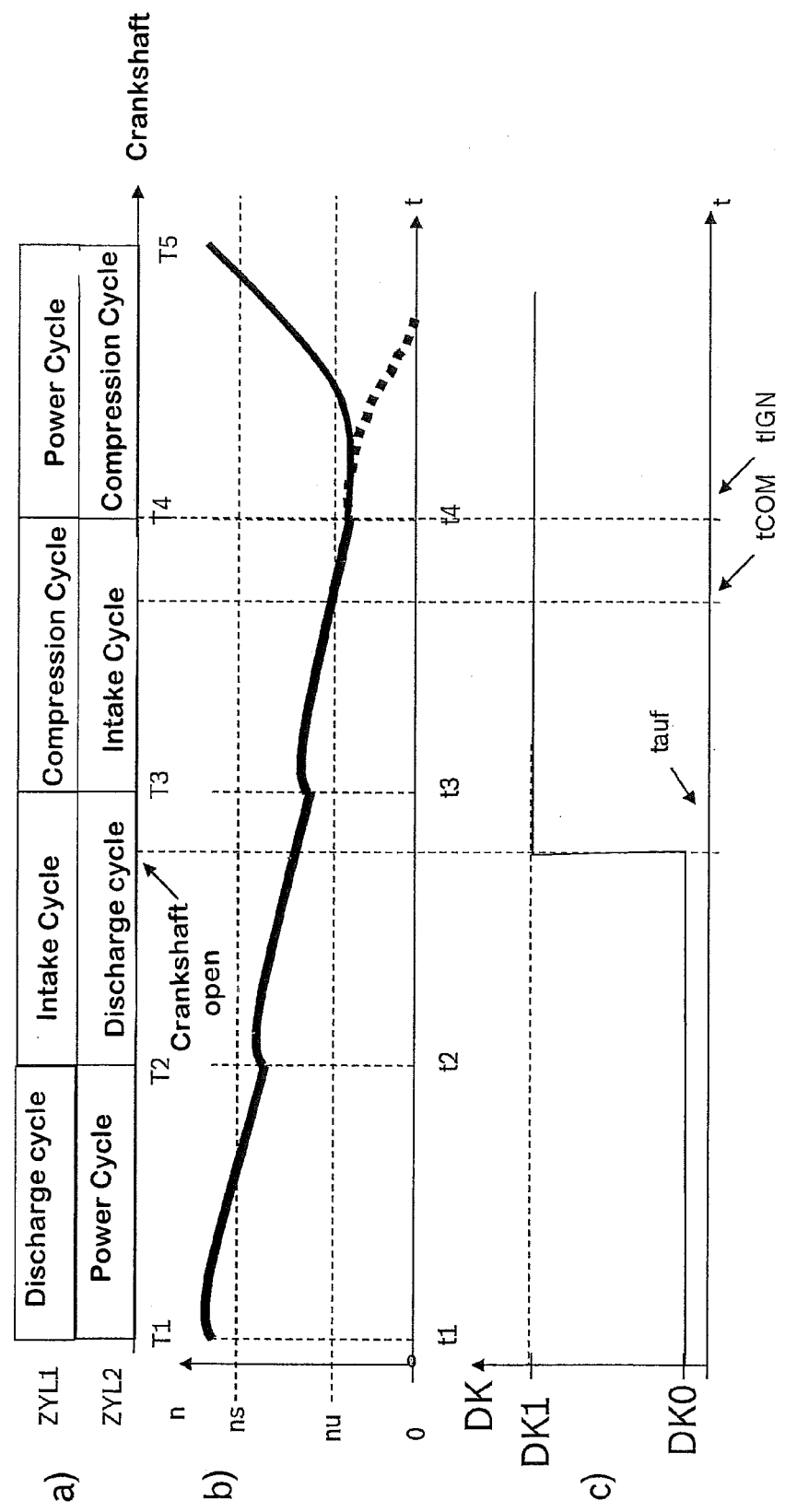
FIG. 1 shows the time characteristic of characteristic quantities in the execution of the method of the present invention.

FIG. 1 shows the time characteristic of the method according to one aspect of the present invention. FIG. 1a illustrates the cycle sequence of intake cylinder ZYL1 and discharge cylinder ZYL2. Crank angle KW is shown on the abscissa. Also shown are a first through fifth dead center T1, T2, T3, T4 and T5. As usual, the dead centers denote the points at which a cylinder of the internal combustion engine experiences a maximum compression. Shown in the example is a four-cylinder internal combustion engine, but other multi-cylinder internal combustion engines are conceivable as well, provided at least three cylinders are present.

At first dead center T1, intake cylinder ZYL1 enters its discharge cycle, at second dead center T1, it enters its intake cycle, at third dead center T3, its compression cycle, and at fourth dead center T4, its power cycle. Accordingly, discharge cylinder ZYL2, shifted by one working cycle, enters its power cycle at first dead center T1, its discharge cycle at second dead center T2, its intake cycle at third dead center T3, and its compression cycle at fourth dead center T4.

FIG. 1b shows the time characteristic of an engine speed n, for instance the time characteristic of the crankshaft revolutions, during the slowing down process of the internal combustion engine. Following a stop request by the driver, which is detected by a control and/or regulation device on which the method of the present invention may also run, for instance because the accelerator is deactivated, the injection and ignition are deactivated (not shown in FIG. 1) and the throttle valve is closed. The air volume supplied to the cylinders entering the intake stroke during the slow-down at a closed throttle valve is thus extremely reduced. Engine speed n of the internal combustion engines drops, as illustrated in the time characteristic, and at instants t1, t2, t3 and t4, which correspond to dead centers T1, T2, T3 and T4, respectively, a local minimum with a subsequent slight increase in engine speed n of the internal combustion engine is observable, which stems from a rebound effect during the maximum compression of the internal combustion engine. It should be noted that because of the variable engine speed n of the internal combustion engine, time axis t and crank angle KW from FIGS. 1b and 1a are both not linear. For example, the time axis is not equidistant.

Between first instant t1 and second instant t2, engine speed n of the internal combustion engine drops below a predefined threshold value ns. At a suitable instant, such as the next dead center, which is second dead center T2 in this instance, the control and/or regulation device detects a drop in engine speed n below engine speed threshold value ns and opens the throttle valve at a suitable crank angle KWauf. This is illustrated in FIG. 1c.

Starting from a closed setting DKO at the beginning of the method, the setting DK of the throttle valve transitions at an instant tauf, which corresponds to crank angle KWauf, to an open state DK1, which may also be a partially open state. Now an air volume flows into intake cylinder ZYL1, which is in the intake cycle at instant tauf or at crank angle KWauf. At a change-of-mind instant tCOM, the control and/or regulation device detects that the driver wants the internal combustion engine to be restarted, for instance by pressure on the accelerator. With the aid of a directly injecting fuel injector, for example, fuel is now injected directly into intake cylinder ZYL1, which is in the compression cycle, and an ignitable fuel/air mixture is produced in this way.

The required fuel quantity is able to be determined via the calibration, such as from characteristics maps obtained in test stand experiments, from opening crank angle KWauf. This is possible because it defines the air volume present in intake cylinder ZYL1. At an ignition point tIGN, which lies in the region of fourth dead center T4, the air/fuel mixture in intake cylinder ZYL1 is ignited. This combustion in the power cycle of intake cylinder ZYL1 accelerates the rotation of the internal combustion engine again. Ignition point tIGN may also be selected in the known manner ahead of fourth dead center T4, still during the compression cycle of intake cylinder ZYL1. Another possibility is an ignition shortly after fourth dead center T4.

This ignition in intake cylinder ZYL1 compresses the air volume in discharge cylinder ZYL2 that it has aspirated in the intake cycle between third dead center T3 and fourth dead center T4. This air spring is very large. It is so large that if no ignition were to take place in intake cylinder ZYL1, the gas spring would brake discharge cylinder ZYL2 completely in the compression cycle, so that the internal combustion engine would come to a standstill. This is indicated by the dashed line in FIG. 1b. It is therefore important to select the fuel/air mixture in such a way that the combustion in intake cylinder ZYL1 is strong enough to enable discharge cylinder ZYL2 to transition to its power cycle.

In internal combustion engines featuring manifold injection, it is important that the injection takes place early enough to allow intake cylinder ZYL1 to aspirate a fuel/air mixture in the intake cycle already. To do so, the restart request must be detected at a much earlier instant, that is to say, even prior to opening instant tauf.

Figure 2:
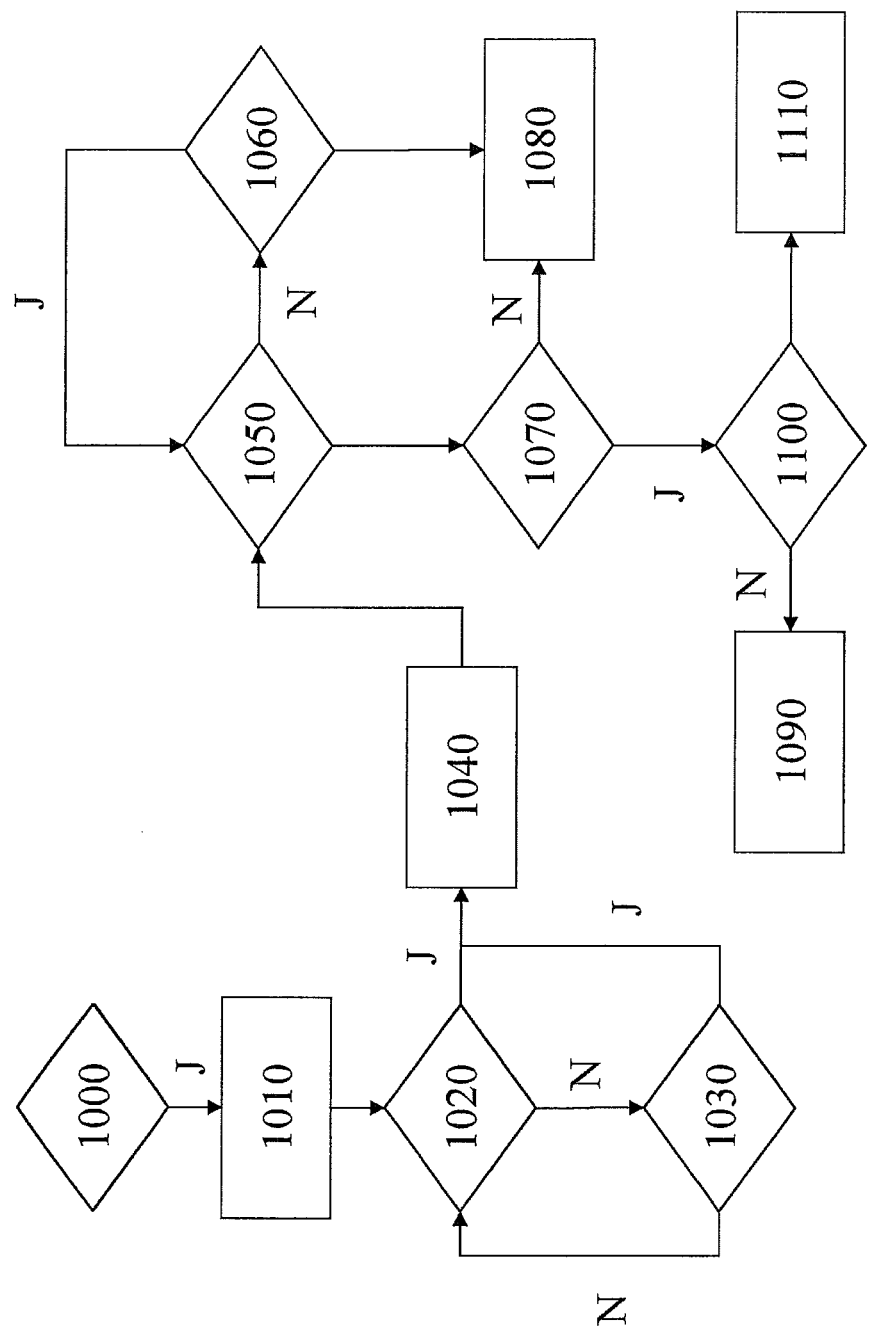
FIG. 2 shows a flow chart of an advantageous specific embodiment of the method according to the present invention.

FIG. 2 shows the sequence of the method. As described, a stop request of the driver is detected at a first instant 1000, so that the control and/or regulation device recognizes that the internal combustion engine is able to be switched off. In this case, step 1010 follows, in which the ignition and injection are switched off, and the throttle valve is closed. In a step 1020, it is then checked whether engine speed n of the internal combustion engine has dropped below engine speed threshold value ns. If this is the case, step 1040 follows, and if this is not the case, it is continued with step 1030. In step 1030 it is checked whether a restart request by the driver has been received. If such a restart request has arrived, step 1040 follows, and otherwise step 1020 ensues.

In step 1040, opening crank angle KWauf is ascertained. If branching from step 1020 to step 1040 took place, opening crank angle KWauf is ascertained in such a way that discharge cylinder ZYL2 comes to a standstill in its compression cycle, provided no further ignition is taking place in a cylinder of the internal combustion engine. With the aid of characteristics maps, for instance, it is possible to ascertain the required air volume that flows into intake cylinder ZYL1, because the ratio of the gas springs of intake cylinder ZYL1 positioned between fourth dead center T4 and fifth dead center T5 in the power cycle, and discharge cylinder ZYL2 positioned in the compression cycle defines the torque acting on the crankshaft of the internal combustion engine.

However, if branching from step 1030 to step 1040 took place, then opening crank angle KWauf may also be selected such that a combustion in the power cycle of intake cylinder ZYL1 is possible, because it is already obvious by then that the internal combustion engine is not to come to a standstill. It is also possible, however, to configure the method in such a way that even if a restart request has been detected, there is a wait until engine speed n has dropped below engine speed threshold ns, and opening crank angle KWauf can be selected in such a way that it either has precisely the same magnitude as in the case of a non-detected restart request (this makes the calibration of the system especially uncomplicated), or it may be selected such that the combustion in the power cycle in intake cylinder ZYL1 becomes especially powerful.

In an intake manifold injection, fuel can be injected into the manifold of the internal combustion engine already at this point, so that an ignitable fuel/air mixture is produced in intake cylinder ZYL1. From characteristics maps, for example, the fuel quantity is metered in such a way that a stoichiometric mixture is created. This is followed by step 1050, in which a query takes place as to whether a restart request is present. If this is the case, step 1070 follows, and if it is not the case, it is continued with step 1060. In step 1060, it is checked whether a restart according to the method of the present invention is still possible in the first place. In an internal combustion engine featuring manifold injection, it is no longer possible to generate an ignitable fuel/air mixture in the intake cycle of intake cylinder ZYL1 once third dead center T3 has been passed.

In internal combustion engines featuring direct injection, tests have shown that it is still possible to inject fuel up to a crank angle of approximately 25° ahead of fourth dead center T4, such that an ignitable fuel/air mixture is produced. Tests have likewise revealed that this fuel/air mixture is still able to be ignited up to 30° past fourth dead center T4. In a directly injecting internal combustion engine, it is therefore still possible to generate an ignitable fuel/air mixture up to an angle of 25° before fourth dead center T4, for example. However, with the aid of tests, this threshold is able to be determined anew for each engine and adapted accordingly. In the event that an ignitable fuel/air mixture is still able to be produced, branching to step 1080 takes place.

In step 1070 is it checked once again, analogous to step 1060, whether a restart is possible. If this is the case, step 1100 follows or, in an alternative exemplary embodiment, step 1090 or, in a further alternative exemplary embodiment, step 1110. If this is not the case, it will be continued with step 1080.

In step 1080, no ignition is initiated, but the engine speed of the internal combustion engines continues to drop down to zero, whereupon the internal combustion engine oscillates to a standstill. If a detected restart request is present, a new start may be initiated from this stationary or virtually stationary internal combustion engine, for instance in that a starter is engaged at an engine speed n of the internal combustion engine close to zero, and the internal combustion engine accelerates.

In optional step 1100, it is checked at fourth dead center T4, which simultaneously is final dead center T4, whether engine speed n of the internal combustion engine is lower than predefinable supplementary torque engine speed threshold nu, which is likewise plotted in FIG. 1. If this is not the case, that is to say, if engine speed n of the internal combustion engine is so high that a direct start without further torque assistance will be successful, then a step 1090 follows, whereas step 1100 ensues in the other case.

However, because no fuel was injected yet in step 1040, in step 1090 fuel is injected either by a manifold injection into the manifold of the internal combustion engine, or by a direct injection directly into intake cylinder ZYL1. Fuel may also be injected into discharge cylinder ZYL2. At ignition point tIGN, the fuel/air mixture is ignited in the power cycle of intake cylinder ZYL1, and engine speed n of the internal combustion engine accelerates. If fuel was injected into discharge cylinder ZYL2, then firing may take place in this cylinder as well, as soon as discharge cylinder ZYL2 has entered its power cycle or shortly before that, and the starting process may be continued in the known manner.

In step 1110 the same steps as in step 1090 are executed. In addition, additional torque from a further torque source is transmitted to the crankshaft in order to overcome the compression cycle of discharge cylinder ZYL2. This additional torque, for example, may be supplied by a connected starter or by closing a clutch, which causes a torque to be transmitted to the crankshaft via the rotating wheels of the vehicle, or also by a hydraulic pressure reservoir.

Following step 1090 or step 1110, the starting process of the internal combustion engine is continued, for instance in a manner known per se.

What is claimed is:

1. A method for providing a rapid restarting of an internal combustion engine that is slowing down at a reduced supplied air volume, the internal combustion engine having a plurality of cylinders, the method comprising:
    decreasing an air volume supplied to the internal combustion engine after a stop request by a driver, the engine thereby slowing down;
    detecting a restart request after the internal combustion engine slows down;
    after detecting the restart request, increasing the air volume supplied to the internal combustion engine;
    producing an ignitable fuel/air mixture by a fuel injection in an intake cylinder, the intake cylinder being a cylinder of the plurality of cylinders that is in an intake cycle when the supplied air volume is increased;
    igniting the mixture in the intake cylinder to produce a combustion in the power cycle of the intake cylinder; and
    producing an ignitable fuel/air mixture by a fuel injection in a discharge cylinder that is the next cylinder going into the intake cycle after the intake cylinder, and generating a torque that shifts the discharge cylinder to its power cycle, the torque being generated by the combustion in the intake cylinder supplemented by a further torque generated by a further torque source;
    wherein the further torque source is one of: an electrical machine, rotating wheels of a vehicle in which the internal combustion engine is installed, or a hydraulic pressure reservoir.

2. The method of claim 1, wherein the supplied air volume is increased as soon as an engine speed of the internal combustion engine has dropped below a predefinable engine speed threshold.

3. The method of claim 1, wherein an opening crank angle, at which the supplied air volume is increased again, is selected so that the combustion produced in the intake cylinder is powerful enough to shift the discharge cylinder up to its power cycle.

4. The method of claim 1, wherein the magnitude of the torque generated by the further torque source is selected as a function of an engine speed of the internal combustion engine at a final dead center, the final dead center being a dead center of the discharge cylinder at which the discharge cylinder enters its compression cycle.

5. The method of claim 4, wherein the further torque source generates a torque whenever the engine speed of the internal combustion engine at the final dead center is less than a predefinable supplementary torque engine speed threshold.

6. The method of claim 4, wherein the further torque source generates no torque when the engine speed (n) of the internal combustion engine at the final dead center is not less than a predefinable supplementary torque engine speed threshold.

7. The method of claim 4, wherein the further torque source generates a torque precisely when the engine speed of the internal combustion engine at the final dead center is less than a predefinable supplementary torque engine speed threshold.

8. The method of claim 1, wherein an ignition in the discharge cylinder occurs to produce a combustion in the power cycle of the discharge cylinder.

9. A method for providing a rapid restarting of an internal combustion engine that is slowing down at a reduced supplied air volume, the internal combustion engine having a plurality of cylinders, the method comprising:
    decreasing an air volume supplied to the internal combustion engine after a stop request by a driver, the internal combustion engine thereby slowing down;
    detecting a restart request after the internal combustion engine slows down;
    after detecting the restart request, increasing the air volume supplied to the internal combustion engine;
    producing an ignitable fuel/air mixture by a fuel injection in an intake cylinder, the intake cylinder being a cylinder of the plurality of cylinders that is in an intake cycle when the supplied air volume is increased;
    igniting the mixture in the intake cylinder to produce a combustion in the power cycle of the intake cylinder; and
    producing an ignitable fuel/air mixture by a fuel injection in a discharge cylinder that is the next cylinder to enter the intake cycle after the intake cylinder, wherein the supplied air volume is increased as soon as an engine speed of the internal combustion engine has dropped below a predefinable engine speed threshold.

10. A computer readable medium having a computer program, which is executable by a processor, comprising:
    a program code arrangement having program code for providing a rapid restarting of an internal combustion engine that is slowing down at a reduced supplied air volume, the internal combustion engine having a plurality of cylinders, the program code, when executed by the processor, causing the processor to perform:
        decreasing an air volume supplied to the internal combustion engine after a stop request by a driver, the internal combustion engine thereby slowing down;
        detecting a restart request after the internal combustion engine slows down;
        after detecting the restart request, increasing the air volume supplied to the internal combustion engine;
        producing an ignitable fuel/air mixture by a fuel injection in an intake cylinder, the intake cylinder being a cylinder of the plurality of cylinders that is in an intake cycle when the supplied air volume is increased;
        igniting the mixture in the intake cylinder to produce a combustion in the power cycle of the intake cylinder; and
        producing an ignitable fuel/air mixture by a fuel injection in a discharge cylinder that is the next cylinder going into the intake cycle after the intake cylinder, and generating a torque that shifts the discharge cylinder to its power cycle, the torque being generated by the combustion in the intake cylinder supplemented by a further torque generated by a further torque source;
        wherein the further torque source is one of: an electrical machine, rotating wheels of a vehicle in which the internal combustion engine is installed, or a hydraulic pressure reservoir.

11. A storage medium for a control device of an internal combustion engine, comprising:
    a computer readable medium having a computer program, which is executable by a processor of the control device, including:

a program code arrangement having program code for providing a rapid restarting of an internal combustion engine that is slowing down at a reduced supplied air volume, the internal combustion engine having a plurality of cylinders, the program code, when executed by the processor, causing the control device to perform:
- decreasing an air volume supplied to the internal combustion engine after a stop request by a driver, the internal combustion engine thereby slowing down;
- detecting a restart request after the internal combustion engine slows down;
- after detecting the restart request, increasing the air volume supplied to the internal combustion engine;
- producing an ignitable fuel/air mixture by a fuel injection in an intake cylinder, the intake cylinder being a cylinder of the plurality of cylinders that is in the intake cycle when the supplied air volume is increased;
- igniting the mixture in the intake cylinder to produce a combustion in the power cycle of the intake cylinder; and
- producing an ignitable fuel/air mixture by a fuel injection in a discharge cylinder that is the next cylinder going into the intake cycle after the intake cylinder, and generating a torque that shifts the discharge cylinder to its power cycle, the torque being generated by the combustion in the intake cylinder supplemented by a further torque generated by a further torque source;
- wherein the further torque source is one of: an electrical machine, rotating wheels of a vehicle in which the internal combustion engine is installed, or a hydraulic pressure reservoir.

12. A control device of an internal combustion engine, comprising:
a computer readable medium having a computer program, which is executable by a processor of the control device, including:
a program code arrangement having program code for providing a rapid restarting of an internal combustion engine that is slowing down at a reduced supplied air volume, the internal combustion engine having a plurality of cylinders, the program code, when executed by the processor, causing the control device to perform:
- decreasing an air volume supplied to the internal combustion engine after a stop request by a driver, the internal combustion engine thereby slowing down;
- detecting a restart request after the internal combustion engine slows down;
- after detecting the restart request, increasing the air volume supplied to the internal combustion engine;
- producing an ignitable fuel/air mixture by a fuel injection in an intake cylinder, the intake cylinder being a cylinder of the plurality of cylinders that is in an intake cycle when the supplied air volume is increased;
- igniting the mixture in the intake cylinder to produce a combustion in the power cycle of the intake cylinder; and
- producing an ignitable fuel/air mixture by a fuel injection in a discharge cylinder that is the next cylinder going into the intake cycle after the intake cylinder, and generating a torque that shifts the discharge cylinder to its power cycle, the torque being generated by the combustion in the intake cylinder supplemented by a further torque generated by a further torque source;
- wherein the further torque source is one of: an electrical machine, rotating wheels of a vehicle in which the internal combustion engine is installed, or a hydraulic pressure reservoir.

13. The method as recited in claim 1, wherein the further torque source is the electrical machine, the electrical machine being a starter.

14. The method as recited in claim 1, wherein the further torque source is the electrical machine, the electrical machine being part of a hybridized drive train of the vehicle.

15. The method as recited in claim 1, wherein the further torque source is the rotating wheels of the vehicle, wherein torque from the rotating wheels is transmitted to a crankshaft of the engine using a clutch.

16. The method as recited in claim 1, wherein the further torque source is the hydraulic pressure reservoir.

* * * * *